United States Patent
Srnec et al.

(10) Patent No.: US 10,773,667 B2
(45) Date of Patent: Sep. 15, 2020

(54) METHODS AND SYSTEMS FOR APU DATA ACQUISITION AND ACTIONS FROM COMBINED SOURCES AND USER INCENTIVES FOR USE

(71) Applicant: THERMO KING CORPORATION, Minneapolis, MN (US)

(72) Inventors: Matthew Srnec, Minnetonka, MN (US); Michael R. Weiss, Bloomington, MN (US)

(73) Assignee: Thermo King Corporation, Minneapolis, MN (US)

(*) Notice: Subject to any disclaimer, the term of this patent is extended or adjusted under 35 U.S.C. 154(b) by 336 days.

(21) Appl. No.: 15/857,250

(22) Filed: Dec. 28, 2017

(65) Prior Publication Data
US 2019/0202382 A1    Jul. 4, 2019

(51) Int. Cl.
*H02J 3/02* (2006.01)
*B60R 16/03* (2006.01)
(Continued)

(52) U.S. Cl.
CPC ............ *B60R 16/03* (2013.01); *B60R 16/023* (2013.01); *G07C 5/008* (2013.01); *G07C 5/085* (2013.01);
(Continued)

(58) Field of Classification Search
CPC ..... B60R 16/03; B60R 16/023; G07C 5/0825; G07C 5/008; G07C 5/085; G09B 5/02;
(Continued)

(56) References Cited

U.S. PATENT DOCUMENTS

| 6,487,717 | B1 | 11/2002 | Brunemann et al. |
| 7,151,326 | B2* | 12/2006 | Jordan .................... B60L 1/003 307/22 |

(Continued)

FOREIGN PATENT DOCUMENTS

| CN | 103744420 A | 4/2014 |
| WO | 2013/181778 | 12/2013 |

OTHER PUBLICATIONS

Fitness App Nudge, Available online at: https://www.digitaltrends.com/mobile/nudge-puts-all-fitness-trackers-in-one-app/ , May 28, 2014, (11 pages).
(Continued)

*Primary Examiner* — Masud Ahmed
(74) *Attorney, Agent, or Firm* — Hamre, Schumann, Muellerr & Larson, P.C.

(57) ABSTRACT

Methods, system, and user interface for collecting, combining, analyzing, providing feedback on APU data and external data are disclosed. The disclosed embodiments can help to track the quality of the APU, to improve the APU, and to make the APU better. The disclosed embodiments can help to improve APU reliability and to set service (or maintenance) intervals. The disclosed embodiments can help to establish a robust APU operating profile and provide a low cost, flexible, and high data-yield solution that can benefit the APU manufactures (or designers, maintainers) and the APU end users. The disclosed embodiments can also provide a low-cost data acquisition from the external devices and the APU through the use on an incentive-based user interface. The disclosed embodiments can utilize the existing mobile device display as HMI and the existing mobile device data plan and network connections as the data channel.

19 Claims, 6 Drawing Sheets

(51) Int. Cl.
*G07C 5/00* (2006.01)
*G07C 5/08* (2006.01)
*B60R 16/023* (2006.01)
*G09B 5/02* (2006.01)
*G09B 19/16* (2006.01)
*G06Q 10/06* (2012.01)
*H04M 1/725* (2006.01)

(52) U.S. Cl.
CPC ............ *G07C 5/0825* (2013.01); *G09B 5/02* (2013.01); *G09B 19/167* (2013.01); *G06Q 10/06398* (2013.01); *H04M 1/7253* (2013.01); *H04M 1/72533* (2013.01)

(58) Field of Classification Search
CPC ........... G09B 19/167; G06Q 10/06398; H04M 1/72533; H04M 1/7253
USPC ...................................................... 705/4, 413
See application file for complete search history.

(56) References Cited

U.S. PATENT DOCUMENTS

| | | | |
|---|---|---|---|
| 7,834,583 B2* | 11/2010 | Elder .................... | B60L 3/0046 320/104 |
| 8,140,358 B1* | 3/2012 | Ling ...................... | G06Q 40/08 705/4 |
| 8,905,166 B2 | 12/2014 | Dalum et al. | |
| 9,369,991 B2 | 6/2016 | Lauer et al. | |
| 10,096,038 B2* | 10/2018 | Ramirez ............ | G06Q 30/0224 |
| 10,121,148 B1* | 11/2018 | Kozlowski .............. | H04W 4/70 |
| 2003/0065630 A1* | 4/2003 | Brown .................. | B67D 7/348 705/413 |
| 2012/0209579 A1 | 8/2012 | Fansler et al. | |
| 2016/0086285 A1* | 3/2016 | Jordan Peters ........ | G06Q 40/08 705/4 |
| 2017/0236210 A1* | 8/2017 | Kumar .................. | B60W 10/30 705/4 |

OTHER PUBLICATIONS

Gamifying telematics for fun and profit, Available online at https://www.telematics.com/gamifying-telematics-for-fun-and-profit/, Dec. 21, 2017 (3 pages).

* cited by examiner

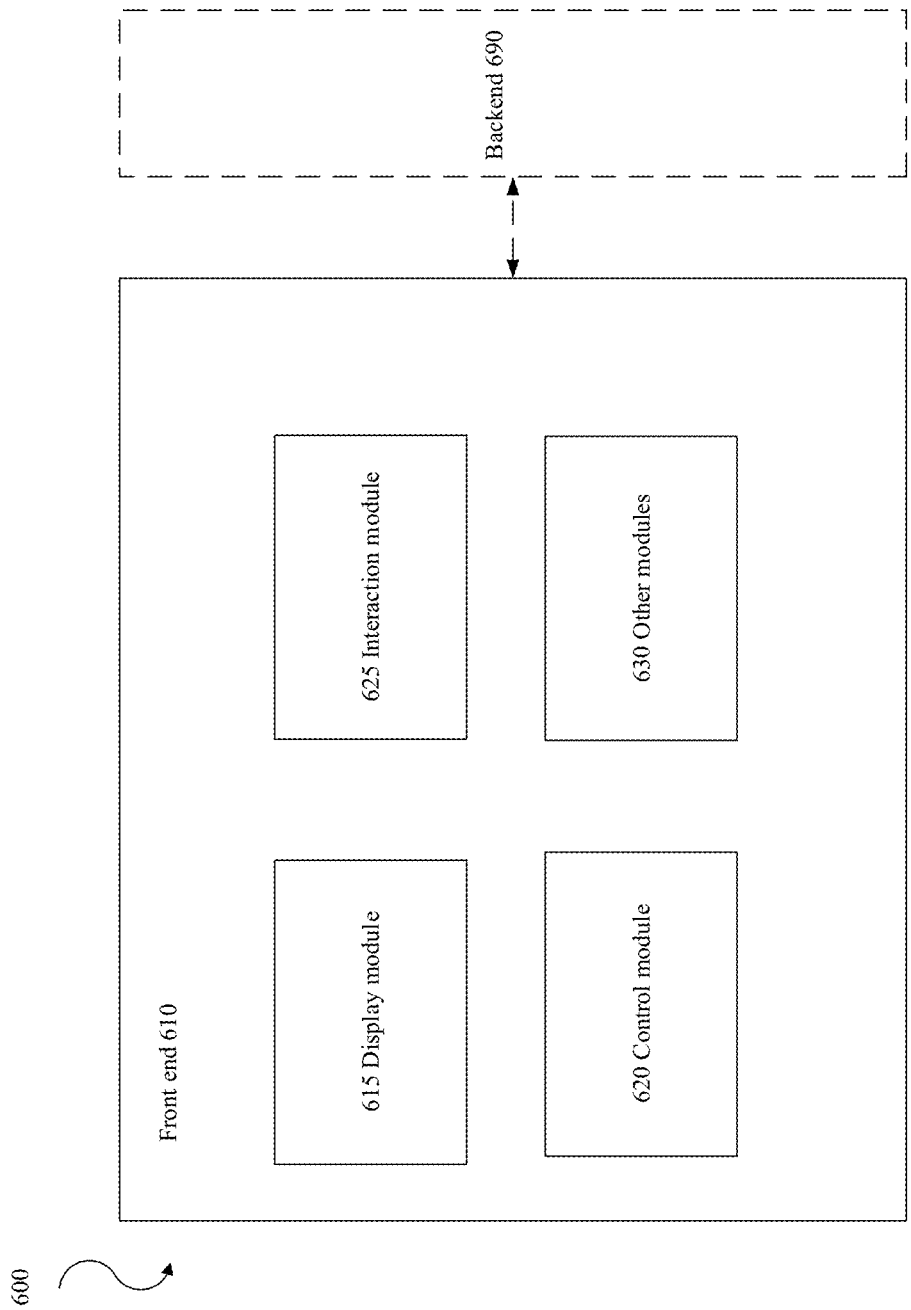

METHODS AND SYSTEMS FOR APU DATA ACQUISITION AND ACTIONS FROM COMBINED SOURCES AND USER INCENTIVES FOR USE

FIELD

This disclosure relates generally to an auxiliary power unit (APU) of a vehicle. More specifically, the disclosure relates to methods and systems for collecting, combining, analyzing, and providing feedback on APU data and/or external data.

BACKGROUND

APUs are commonly used with large tractors or trucks (e.g., semi-tractors) to provide power to a sleeper cabin for the occupant (e.g., driver or passenger) to rest during a journey when the primary power source (e.g., tractor prime mover, high voltage battery source, etc.) is turned off (i.e., deactivated). This can reduce fuel consumption, maintenance costs, emissions, and noise generated by not requiring the tractor main power source to operate (e.g., idle when the main power source is a tractor prime mover) during occupant rest periods or other periods of vehicle non-movement.

SUMMARY

This disclosure relates generally to an auxiliary power unit (APU) of a vehicle. More specifically, the disclosure relates to methods and systems for collecting, combining, analyzing, and providing feedback on APU data and/or external data.

The embodiments described herein allow data acquired from the APU to facilitate tracking how and when the APU is used. The disclosed embodiments can help to reduce the cost by, for example, licensing the user interface to partnered companies in exchange for a data channel. This disclosure can facilitate tracking how and when the APU is used at a lower cost than other solutions such as using current vehicle Telematics to monitor the APU.

The disclosed embodiments can help to track the quality of the APU and/or to improve the APU. The disclosed embodiments can help to improve APU reliability and to set service (or maintenance) intervals of the APU. The disclosed embodiments can help to establish a robust APU operating profile and provide a low cost, flexible, and high data-yield solution that can benefit the APU manufactures (or designers, maintainers) and the APU end users.

The disclosed embodiments can also provide a low-cost data acquisition from external device(s) (e.g., a prime mover, a smart inverter, a battery, sensors, a positioning device, etc.) and the APU through the use on an incentive-based user interface. The disclosed embodiments can provide the APU end user a human machine interface (HMI) that can be configured to the user's preferences and have features that would exceed cost targets if implemented in a fixed or a dedicated HMI device for the APU. The disclosed embodiments can utilize the existing mobile device display as an HMI and the existing mobile device data plan and network connections as the data channel. The disclosed embodiments can provide low cost incentives either directly to the user or in partnership with the user's employer or a 3rd party company to help to maintain the connectivity and data channel (for example, between the APU controller and the APU). The disclosed embodiments can provide a solution to partner with, for example, an in-cab mobile technology company that has access to the vehicle data, to create a mutually beneficial exchange of data. The disclosed embodiments can provide a solution to license the user interface to partnered companies in exchange for a data channel. The disclosed embodiments can create a robust and feature-rich HMI experience via, for example, a mobile device.

In some embodiments, a method for collecting, combining, analyzing, and providing feedback on APU data and external data is disclosed. The method includes an APU controller linking to an APU of a vehicle. The method also includes the APU controller collecting APU data from the APU. The APU data indicates an operational state of the APU. Also, the method includes an external controller linking to at least one device that is external to the APU. Further, the method includes the external controller collecting external data from the device, the external data indicating an operational state of the device. Moreover, the method includes a central controller linking to the APU controller and the external controller, and the central controller determining an APU usage status based on the APU data and the external data. The APU usage status indicates an APU usage information under the operational state of the device.

In some embodiments, a system for collecting, combining, analyzing, providing feedback on APU data and external data is disclosed. The system includes an APU controller, an external controller, and a central controller. The APU controller is configured to link to an APU of a vehicle, and collect APU data from the APU, the APU data indicating an operational state of the APU. The external controller is configured to link to at least one device that is external to the APU, and collect external data from the device, the external data indicating an operational state of the device. The central controller is configured to link to the APU controller and the external controller, and determine an APU usage status based on the APU data and the external data, the APU usage status indicating an APU usage information under the operational state of the device.

In some embodiments, a user interface for collecting, combining, analyzing, and providing feedback on APU data and external data is disclosed. The user interface includes a control module and a display module. The control module is configured to provide incentives for users to link an APU controller to an APU of a vehicle. Also, the control module is configured to link an external controller to a plurality of devices that are external to the APU. The display module is configured to display an APU usage status based on combined APU data and external data.

BRIEF DESCRIPTION OF THE DRAWINGS

References are made to the accompanying drawings that form a part of this disclosure and which illustrate embodiments in which the systems and methods described in this specification can be practiced.

FIG. 6 illustrates a schematic view of a user interface for collecting, combining, analyzing, and providing feedback on APU data and external data, according to some embodiments.

Like reference numbers represent like parts throughout.

DETAILED DESCRIPTIONS

This disclosure relates generally to an auxiliary power unit (APU) of a vehicle. More specifically, the disclosure relates to methods and systems for collecting, combining, analyzing, and providing feedback on APU data and/or external data.

Figure 1:
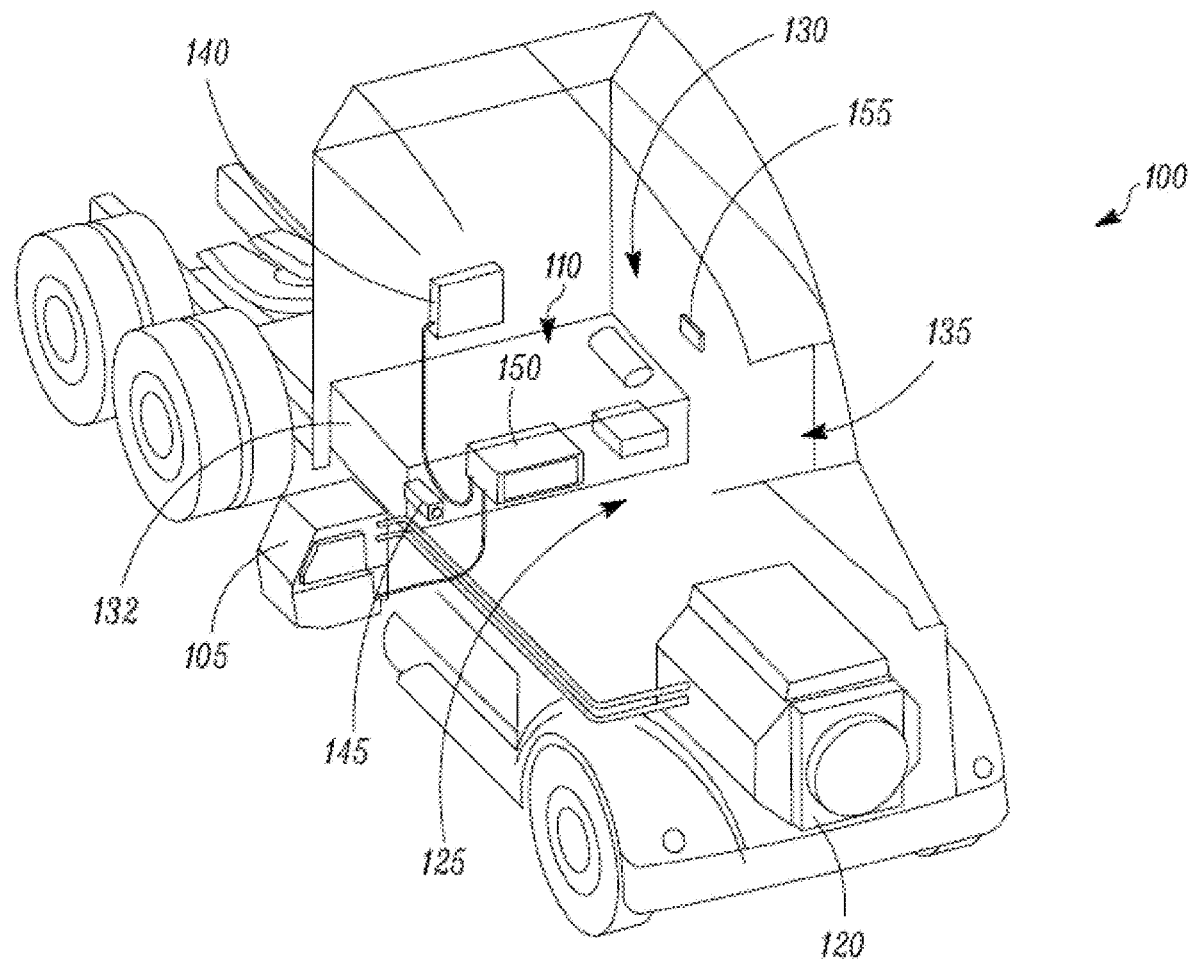
FIG. 1 illustrates a schematic view of a vehicle with an APU and a secondary HVAC system, according to some embodiments.

FIG. 1 illustrates a schematic view of a vehicle 100 with an APU 105 and a secondary HVAC system 110, according to some embodiments. The vehicle 100 is a semi-tractor (e.g., a class 8 tractor) that can be used, for example, to transport cargo stored in a cargo compartment (e.g., a container, a trailer, etc.) to one or more destinations. It will be appreciated that in other embodiments, the vehicle 100 can be, for example, a straight truck, a van, etc. Hereinafter, the term "vehicle" shall be used to represent all such tractors and trucks, and shall not be construed to limit the invention's application solely to a tractor in a tractor-trailer combination. In some embodiments, the APU 105 can be a product (for example, a bolt-on APU) separate from the vehicle 100. In some embodiments, the APU 105 can be integrated in the vehicle power system design (for example, in an OEM-integrated bunk climate control system).

The vehicle 100 includes a primary power source 120, a cabin 125 defining a sleeping portion 130 and a driving portion 135, and a plurality of vehicle accessories (not shown). The cabin 125 can be accessible via a driver side door (not shown) and a passenger side door (not shown). The cabin 125 can include a primary HVAC system (not shown) as a vehicle accessory that can be configured to provide conditioned air within driving portion 135 and potentially the entire cabin 125, and the secondary HVAC system 110 for providing conditioned air within the sleeping portion 130. The cabin 125 can also include a plurality of cabin accessories (not shown). Examples of cabin accessories can include, for example, sunshade(s) for a window/windshield of the vehicle 100, a refrigerator, a television, a video game console, a microwave, one or more device charging station(s), a continuous positive airway pressure (CPAP) machine, and a coffee maker. The secondary HVAC system 110 can also be considered as a cabin accessory.

The primary power source 120 can provide sufficient power to operate (e.g., drive) the vehicle 100 and any of a plurality of vehicle accessories (e.g., the primary HVAC system) and cabin accessories. In some embodiments, the primary power source 120 is the only power source that provides power to the primary HVAC system. The primary power source 120 can also provide power to charge, for example, batteries of the APU 105. In some embodiments, the primary power source 120 can be a prime mover such as, for example, a diesel engine. In some embodiments, the primary power source 120 can be an electric engine. In some embodiments, the primary power source 120 can be a hybrid power source including, for example, a prime mover and an electric motor.

The APU 105 is a secondary power unit for the vehicle 100 when the primary power source 120 is unavailable. When, for example, the primary power source 120 is unavailable, the APU 105 can be configured to provide power to one or more of the vehicle accessories and the cabin accessories. In particular, the APU 105 can provide power to the secondary HVAC system 110 when the primary power source 120 (and accordingly the primary HVAC system) is unavailable. In some embodiments, the APU 105 can be an electric powered APU. In other embodiments, the APU 105 can be a prime mover powered APU. The APU 105 can be attached to the vehicle 100 using any attachment method. In some embodiments, the APU 105 can be turned on (i.e., activated) or off (i.e., deactivated) by an occupant (e.g., driver or passenger) of the vehicle 100. The APU 105 generally does not provide sufficient power for operating (e.g., driving) the vehicle 100.

In some embodiments, the APU 105 can include a power source (e.g., a prime mover, a battery, a fuel cell, etc.) for powering the APU 105, a refrigerant compressor (not shown) for the secondary HVAC system 110, an alternator (not shown), a maintenance switch (not shown), etc. The secondary HVAC system 110 includes a refrigerant compressor (not shown), a condenser unit 140, a heater unit 145, a configurable evaporator unit 150 and a controller 155. In some embodiments, the refrigerant compressor can be provided in the APU 105. In some embodiments, the refrigerant compressor can be provided in the configurable evaporator unit 150. In the embodiment shown in FIG. 1, the condenser unit 140 is mounted at the back of the cabin 125 for condensing refrigerant received from the refrigerant compressor. The heater unit 145 is configured to provide heated air to the sleeping portion 130 and potentially the driving portion 135. In the embodiment shown in FIG. 1, the heater unit 145 is positioned under a sleeping bunk 132 in the sleeping portion 130. The controller 155 can be a human machine interface (HMI) controller that controls operation of the secondary HVAC system 110 (including, for example, a power and operation mode of the secondary HVAC system 110, a temperature of conditioned air in the cabin 125, a fan speed of an evaporator blower of the configurable evaporator unit 150, etc.) and provides operation status information of the secondary HVAC system 110. In the embodiment shown in FIG. 1, the HMI controller is positioned onto a wall of the vehicle 100 in the sleeping portion 130. The configurable evaporator unit 150 is configured to provide conditioned air within the sleeping portion 130 and potentially the driving portion 135. In the embodiment shown in FIG. 1, the configurable evaporator unit 150 is positioned under the sleeping bunk 132 in the sleeping portion 130. It will be appreciated that in other embodiments, the configurable evaporator unit 150 can be positioned in any other location within the vehicle 100 including, for example, on any side of the sleeping portion 130, within a cabinet (not shown) of the sleeping portion 130, within a closet (not shown) of the sleeping portion 130, etc. The configurable evaporator unit 150 can include one or more air outlet(s) from which one or more air duct(s) (not shown) can be connected to provide airflow to different locations within the vehicle 100.

Figure 2:
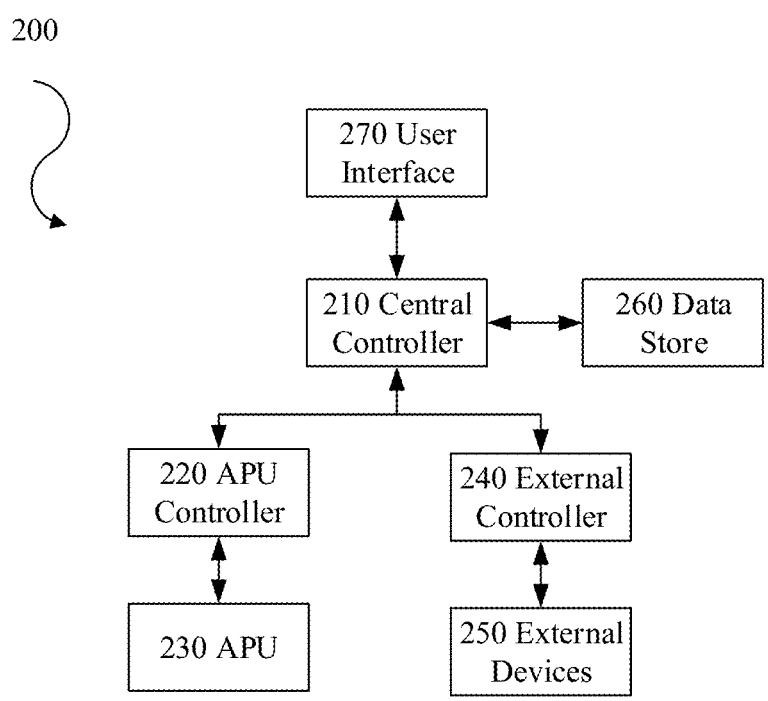
FIG. 2 illustrates a block diagram of a system for collecting, combining, analyzing, and providing feedback on APU data and external data, according to some embodiments.

FIG. 2 illustrates a block diagram of a system 200 for collecting, combining, analyzing, and providing feedback on APU data and external data, according to some embodiments.

The system 200 includes an APU 230 (such as the APU 105 shown in FIG. 1). The system further includes an APU controller 220. In some embodiments, the APU controller 220 can be within a mobile device, for example, a mobile phone. In some embodiments, the APU controller 220 can be within a gateway or a hub. The gateway or hub can be used in an application such as in a truck yard data gathering system.

The APU controller 220 is in communication with the APU 230. It will be appreciated that the APU controller 220 can link to the APU 230 using a wired connection or a wireless connection. In some embodiments, the APU controller 220 can link to the APU 230 using a wireless connection, for example, a Bluetooth connection, a Zigbee connection, or other local wireless connection. It will be appreciated that device A links to device B can be defined as device A initiating a communication between devices A and B. Devices A and B then use a predetermined communication protocol (for example, Bluetooth) to communicate with each other. Both devices A and B have hardware components that support the predetermined communication protocol. After the communication between devices A and B is established, data can be communicated between devices A and B. In some embodiments, when the APU has a Bluetooth radio, data from the APU can be accessed via a Bluetooth access point (for example, at dealers or in yards of the vehicle manufacture, etc.).

Figure 5:
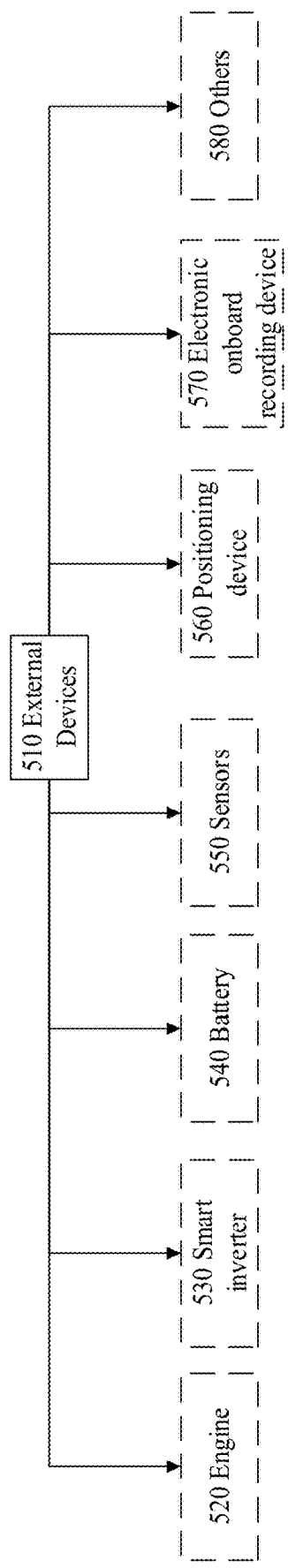
FIG. 5 illustrates a list of external devices in a system for collecting, combining, analyzing, and providing feedback on APU data and external data, according to some embodiments.

In some embodiments, the system 200 includes external devices 250. FIG. 5 shows some examples of the external devices 250. The system 200 also includes external controller 240. In some embodiments, the external controller 240 can be within a mobile device, for example, a mobile phone. In some embodiments, the external controller 240 can be any suitable device in communication with the external devices 250. The external controller 240 is in communication with the external devices 250. It will be appreciated that the external controller 240 can link to the external devices 250 using a wired connection or a wireless connection. In some embodiments, the external controller 240 can link to the external devices 250 using a wireless connection, for example, a Bluetooth connection, a ZigBee connection, or other local wireless connection. In some embodiments, there can be one external controller 240 that links to one external device 250. In some embodiments, there can be multiple external controllers 240 that link to multiple external devices 250, respectively. In some embodiments, there can be one external controller 240 that links to multiple external devices 250. It will be appreciated that each of the external devices 250 can use a communication protocol (and can have hardware component that supports the communication protocol) that is independent from other external devices 250 to communicate with the external controller 240. For example, external device A can use Bluetooth communication protocol to communicate with the external controller 240, while external device B can use Zigbee communication protocol to communicate with the external controller 240.

The system 200 also includes a central controller 210. The central controller 210 is in communication with the APU controller 220 and the external controller(s) 240. In some embodiments, the central controller 210 can be within a mobile device, for example, a mobile phone. In some embodiments, the central controller 210 can be within a server. In some embodiments, the server can be a local server, for example, a personal computer. In some embodiments, the server can be a remote server in a cloud (i.e., a network of remote servers hosted on the Internet and used to store, manage, and process data in place of local servers or personal computers). In such embodiments, the APU controller 220 and the external controller 240 can communicate with the central controller 210 through, for example, cellular, WiFi, or any other suitable connections. It will be appreciated that the central controller 210 can link to the APU controller 220 and the external controller(s) 240 using a wired communication link or wireless communication link. In some embodiments, the central controller 210 can link to the APU controller 220 and the external controller(s) 240 using a wireless connection, for example, a Bluetooth connection, a Zigbee connection, or other local wireless connection. It will be also appreciated that each of the APU controller 220 and the external controller(s) 240 can use its own communication protocol (and can have hardware component that supports the communication protocol) to communicate with the central controller 210. For example, the APU controller 220 can use Bluetooth communication protocol to communicate with the central controller 210, while the external controller(s) 240 can use ZigBee communication protocol to communicate with the central controller 210.

The system 200 includes a data store 260. The data store 260 can be any suitable data storage such as a non-transitory memory. In some embodiments, the data store 260 can be within a mobile device, for example, a mobile phone. In some embodiments, the data store 260 can be in a cloud. In some embodiments, the data store 260 can be within a local server, for example, a personal computer. The central controller 210 is in communication with the data store 260. It will be appreciated that the communication between the central controller 210 and the data store 260 can be a wired connection or a wireless connection (for example, Bluetooth, Zigbee, cellular or WiFi).

The system 200 further includes a user interface 270. In some embodiments, the user interface 270 can be a mobile HMI, for example, a mobile phone app. In some embodiments, the user interface 270 can be a web site or a webpage. FIG. 6 describes a user interface in detail. The central controller 210 is in communication with the user interface 270. It will be appreciated that the communication between the central controller 210 and the user interface 270 can be a wired connection or a wireless connection (for example, Bluetooth, ZigBee, cellular or Wi-Fi).

Figure 3:
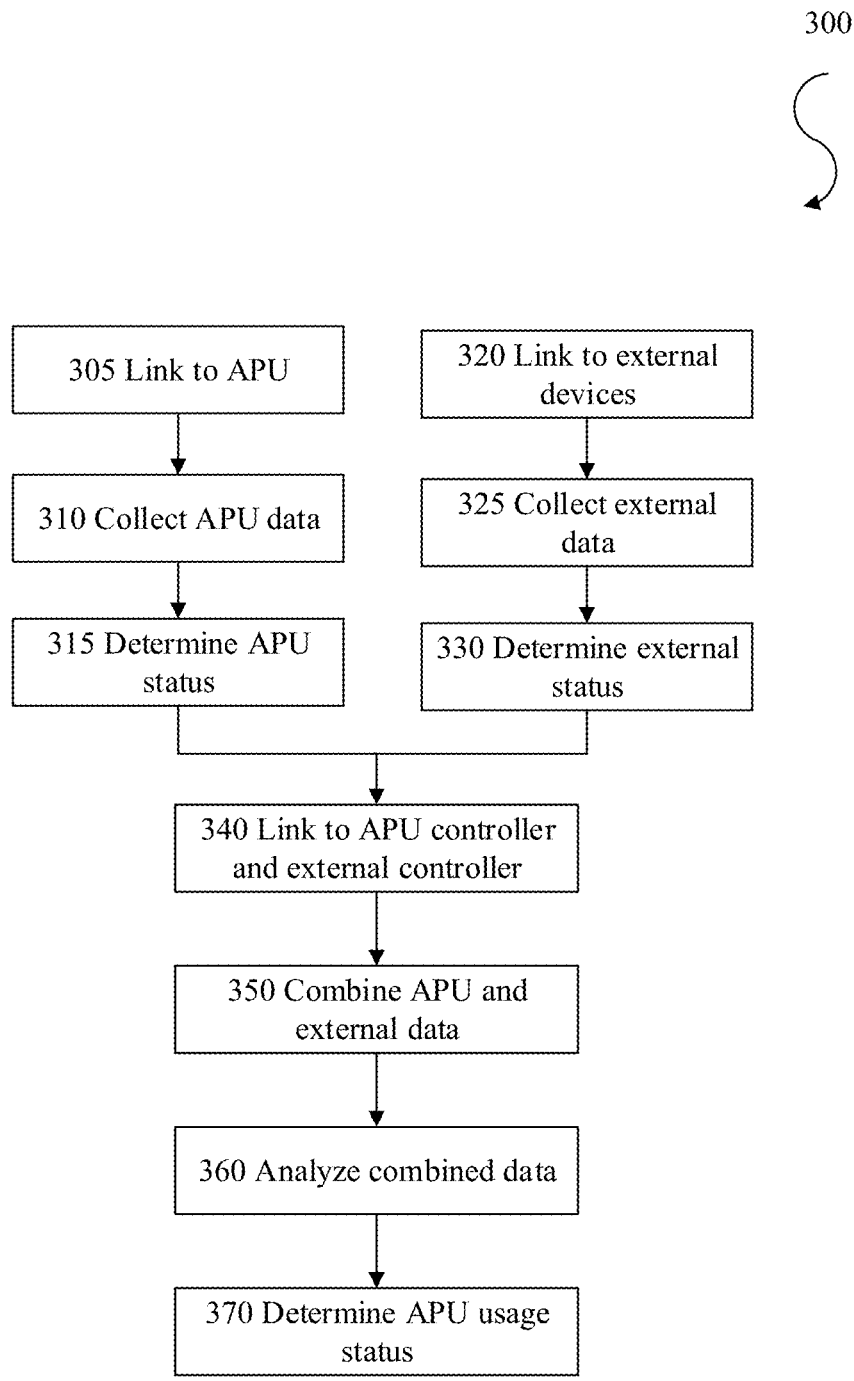
FIG. 3 illustrates a flow diagram of a method for collecting, combining, and analyzing APU data and/or external data, according to some embodiments.

Operation of the system 200 is described below with respect to FIG. 3. FIG. 3 illustrates a flow diagram of a method 300 for collecting, combining, and analyzing APU (such as the APU 105 shown in FIG. 1) data and/or external data, according to some embodiments.

At 305, the APU controller (such as the APU controller 220 shown in FIG. 2) links to the APU (such as the APU 230 shown in FIG. 2). In some embodiments, a user (for example, a driver of the vehicle) can initiate the action to link the APU controller to the APU through a user interface (such as the user interface 270 shown in FIG. 2). The user can be incentivized to initiate the action to link the APU controller to the APU, and/or incentivized to maintain the linkage (or connectivity or data channel) between the APU controller and the APU. In some embodiments, the user interface can have an incentive interface to provide user the incentives. In some embodiments, when a certain condition is met (for example, when the user initiates the action to link the external controller to the external devices, and/or when the user maintains the linkage between the external controller and the external devices for a predetermined period of time), the incentive interface can display incentive messages, for example, messages about that the use is eligible for free shower(s) at a truck stop, and/or free meal(s), etc. In some embodiments, the employer of the user or a third party can provide the incentives. Then the method 300 then proceeds to 310.

At 310, the APU controller collects data from the APU. The APU data can indicate an operational status of the APU.

In some embodiments, data collected from the APU can include APU serial numbers, APU service dates, APU sensor data, APU run hours, APU electrical load, and/or other information. In some embodiments, some APU data (for example, APU serial numbers, APU service dates, APU sensor data, or APU electrical load) are used by APU manufactures/designers/maintainers, and might not be important to the user (for example, driver, and/or fleet manager). In some embodiments, some APU data (for example, APU run hours) can be used by both APU manufactures/designers/maintainers and the user.

It will be appreciated that data collected from the APU can include a timeline. The timeline can indicate the start time and the end time associated with the APU data. For example, a timeline associated with the APU run hours can indicate when the APU starts to run and when the APU stops running. In some embodiments, the APU controller can store the collected APU data in a data store (such as the data store 260 shown in FIG. 2). Then the method 300 proceeds to 315.

At 315, the APU controller determines an APU status based on the data collected from the APU. The APU status can indicate how the APU is being used (for example, has the APU been continuously run for a predetermined period of time?), the connectivity between the APU controller and the APU (for example, the connection is established or lost), etc. Then the method 300 proceeds to 340.

At 320, the external controller (such as the external controller 240 shown in FIG. 2) links to the external devices (such as the external devices 250 shown in FIG. 2). In some embodiments, a user (for example, a driver of the vehicle) can initiate the action to link the external controller to the external devices through a user interface (such as the user interface 270 shown in FIG. 2). The user can be incentivized to initiate the action to link the external controller to the external devices, and/or incentivized to maintain the linkage between the external controller and the external devices. In some embodiments, the user interface can have an incentive interface to provide user the incentives. For example, when the user initiates the action to link the external controller to the external devices, and/or when the user maintains the linkage between the external controller and the external devices for a predetermined period of time, the incentive interface can display incentive messages, for example, messages about that the use is eligible for free shower(s) at the truck stop, and/or free meal(s), etc. In some embodiments, the employer of the user or a third party can provide the incentives. Then the method 300 proceeds to 325.

At 325, the external controller collects data from one or more external devices. The external data can indicate an operational state of the device. Data collected from the one or more external devices are described in detail in FIG. 5. It will be appreciated that data collected from the one or more external devices can include a timeline. The timeline can indicate the start time and the end time associated with the external devices data. For example, the external device can be a prime mover, and a timeline associated with a prime mover ON time can indicate when the prime mover starts to run and when the prime mover stops running. In some embodiments, the external controller can store the collected external device data in a data store (such as the data store 260 shown in FIG. 2). Then the method 300 proceeds to 330.

At 330, the external controller determines a state of one or more external devices based on the data collected from the external devices. The state of the one or more external devices can indicate how the one or more external devices are being used, the connectivity (for example, the connection is established or lost) between the external controller and the external devices, etc. Then the method 300 proceeds to 340.

At 340, the central controller (such as the central controller 210 shown in FIG. 2) links to the APU controller (such as the APU controller 220 shown in FIG. 2) and the external controller (such as the external controller 240 shown in FIG. 2). In some embodiments, the initiation of the action to link the central controller to the APU controller and the external controller can be conducted by, for example, a mobile phone app or an application (for example, a web-based application or a locally installed application). In some embodiments, the initiation of the action to link the central controller to the APU controller and the external controller can be run at backend. Then the method 300 proceeds to 350.

At 350, the central controller obtains the APU data from the APU controller and the external devices data from the external controller. In some embodiments, the central controller can store the APU data and the external devices data in a data store (such as the data store 260 shown in FIG. 2). The central controller combines the APU data and the external devices data. In some embodiments, external devices data can be the prime mover data that include temperature of the prime mover or coolant of the prime mover. The prime mover data can be sent to the external controller and can be combined with the APU data by the central controller. In an application, the Diesel APU can be used to warm the prime mover e.g., in winter time for a cold start. The combined data (e.g., the temperature of the coolant of the prime mover and the APU data) can help to determine whether the coolant temperature is at acceptable level, and if yes, the system can turn the valve off to not to circulate the coolant and can save the energy that would have been used to circulate the coolant. Then the method 300 proceeds to 360.

At 360, the central controller analyzes the combined APU and external devices data. In some embodiments, when analyzing the combined APU data and external devices data, the central controller compares the timeline associated with the APU data and the timeline associated with the external devices data. For example, when the external device is the prime mover of the vehicle, the APU data is the APU ON state (indicating APU is started) associated with a first timeline (that indicates when the APU ON state starts and stops), the external device data is the prime mover OFF state (indicating the prime mover is turned off) associated with a second timeline (that indicates when the prime mover OFF state starts and stops), the central controller determines whether there is an overlap between the APU ON state and the prime mover OFF state with regard to a period of time, and how long the period of time is.

In some embodiments, the external device can include a driver's activity monitor (for example, Fitbit, Garmin, Apple Watch etc.). The activity monitor can detect whether the driver is active, at rest, or sleeping. The activity monitor can detect or set a sleep period. The central controller can combine the detected external data with an APU set point to adjust climate control for active/rest/sleep intervals. In some embodiments, the central controller can be the controller 155 of FIG. 1. For example, when the driver is active, the central controller can adjust the control of, for example, operation of the secondary HVAC system 110 of FIG. 1 (including, for example, a power and operation mode of the secondary HVAC system 110, a temperature of conditioned air in the cabin 125, a fan speed of an evaporator blower of the configurable evaporator unit 150, the heater unit 145, etc.) to adjust, for example, the temperature of conditioned air to correspond to the driver's activity level. In some embodiments, the central controller can communicate with the controller 155 of FIG. 1 and the controller 155 of FIG. 1 controls operation of the secondary HVAC system 110 of FIG. 1.

In some embodiments, the external data can include proximity to a planned route rest stop (for example, a truck stop, a delivery location, a distribution domicile, etc.) obtained from a mobile device or an ELD (Electronic Logging Device) system or an app. The central controller can adjust the control of, for example, operation of the secondary HVAC system 110 of FIG. 1 to start a sleeping/rest area climate control of the APU to automatically pre-cool or pre-heat at a predetermined time/distance before reaching the rest stop.

In some embodiments, the external data can include a prime mover (for example, an engine) run/stop state and idle-limiter device count-down information and/or location and/or the driver's duty status (on or off duty) from the ELD. The central controller can wait for the prime mover to shut down, or use a connection to the prime mover control network to shut down the primary engine when, for example, the count-down reaches zero. The central controller can then start the APU or the bunk climate control operating from the auxiliary engine or from the battery power source.

In some embodiments, the external data can include shore power availability based on the location or domicile information obtained from a mobile app or from the ELD system. The external data can also include battery status from an inverter/battery charging system as part of the APU control linked to the APU. The central controller can alert the driver if the driver is not using shore power in locations where available.

In some embodiments, the external data can include a solar charging system status. The APU data can be a battery status. The central controller can alert the driver if the solar charging system indicates that solar energy is available and the APU/battery monitor indicates that charging is needed but no charging is taking place. In some embodiments, the solar charging system can be a trailer-truck tethered solar charging system.

In some embodiments, the external data can include the driver location via a mobile device, pre-determined number of "off-duty" periods from the ELD system, and/or prime mover idle time during off-duty periods from vehicle. The APU data can be the APU use during off-duty periods where prime mover is in idle time. The central controller can reward the driver based on the achievement of prime mover idle time and/or APU use in off-duty periods.

Figure 4:
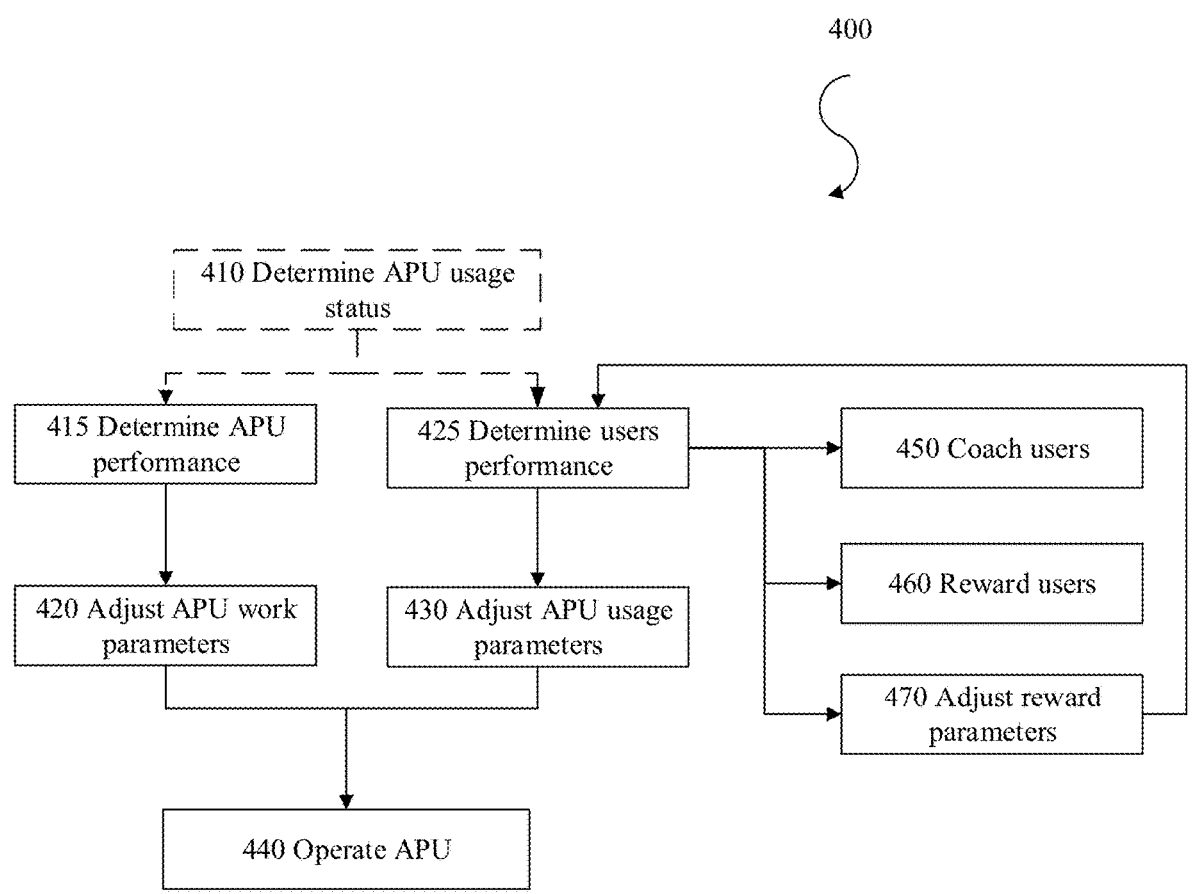
FIG. 4 illustrates a flow diagram of a method for analyzing and providing feedback on APU data and/or external data, according to some embodiments.

Then the method 300 proceeds to 370. At 370, the central controller determines an APU usage status (for example, whether the APU has been continuously used for a predetermined period of time during the prime mover OFF state) based on the combined APU and/or external devices data. FIG. 4 describes how the central controller determines the APU usage status in detail. In some embodiments, the central controller can send the determined APU usage status to a user interface (such as the user interface 270 shown in FIG. 2).

FIG. 4 illustrates a flow diagram of a method 400 for analyzing and providing feedback on APU data from an APU (such as the APU 105 shown in FIG. 1) and/or external data, according to some embodiments.

At 410, the central controller can optionally determine an APU usage status based on the combined APU and/or external devices data (see also 370 shown in FIG. 3). In some embodiments, the APU usage status can be used by APU manufactures (or designers, maintainers). In some embodiments, the APU usage status can include, for example, how the APU is being used in the field. For example, the APU usage status can include APU use for climate control or for battery charging. The APU use can be combined with external data to measure electrical loads. The APU use can be combined with an inverter use for testing. The APU usage status can include APU use for climate pull-down, maintaining climate, or engine heating. The APU use can be combined with driver's activity monitor data or ELD system data to determine truck operational state prior to and during APU run-time. The APU usage status can include data on variation of APU use based on the driver. The APU use can be combined with driver's identification from a linked mobile device or from the ELD System.

In some embodiments, the external device can be a location device (for example, a GPS, a mobile device, an ELD system, or the like). The APU usage status can be how well the APU is being used in a particular region. In some embodiments, the APU use can be combined with external data on the location where the APU is used and the routes driven. The combined data can be beneficial for electric or hybrid APU/climate control systems where some regions may require more run time and may affect battery life. Predictive maintenance and planned battery replacement can be more closely managed truck to truck, and/or trucks can be managed to specific routes based on averaging of use to extend overall battery life. In some embodiments, the external device can be a temperature sensor. The APU usage status can be how well the APU is being operated in actual temperatures. Then the method 400 proceeds to 415.

At 415, the central controller determines an APU performance data based on the APU usage status. In some embodiments, the APU performance data can help to track the quality of the APU and/or to improve the APU. The APU performance data can be used to improve APU reliability and to set service (or maintenance) intervals. The APU performance data can help to establish a robust APU operating profile and provide a low cost, flexible, and high data-yield solution that can benefit the APU manufactures (or designers, maintainers). In some embodiments, the central controller can send the APU performance data to a user interface (such as the user interface 270 shown in FIG. 2). Then the method 400 proceeds to 420.

At 420, the system can adjust APU work parameters, for example, via the APU controller. In some embodiments, the adjustment of the work parameters can be done via a user interface (such as the user interface 270 shown in FIG. 2). In some embodiments, the APU work parameters are APU operational parameters not visible to the end user (for example, drivers or fleet managers) and adjusted during service (or maintenance) intervals. APU operational parameters that are visible to the users include parameters (such as return air temperature, engine over-temperature, APU run hours, or alarm codes) that enable either the user or the fleet manager to detect in-service and trending conditions and help expedite troubleshooting and dealer service effectiveness. Then the method 400 proceeds to 440. At 440, the APU is operated under the adjusted work parameters.

Referring back to 410, in some embodiments, the APU usage status can be used by end users (for example, drivers or fleet managers). In some embodiments, the APU usage status can include, for example, how the APU is being used in the field. Then the method 400 proceeds to 425.

At 425, the central controller determines a user's (for example, a driver's) performance based on the APU usage status. In some embodiments, the system and method disclosed can help coach users to avoid multiple pull-down events detected by the APU controller. For example, more than two pull downs from a pre-set high ambient temperature can result in a coaching message. Avoiding pull-downs in high ambient temperature for a pre-set period can result in reward. Optimizing the APU/bunk climate control and the stored energy usage can be rewarded where misuse and use outside of pre-set limits can result in a coaching message to the driver.

In some embodiments, the external device can be a prime mover of the vehicle, the APU data can be the APU ON state associated with a first timeline, the external device data can be the prime mover OFF state associated with a second timeline. In these embodiments, the users' performance can be whether there is an overlap between the APU ON state and the prime mover OFF state with regard to a period of time (for example, a number of consecutive periods), and how long the period of time is.

In some embodiments, the central controller can send the users' performance information to a user interface (such as the user interface 270 shown in FIG. 2). From 425, the method 400 can proceed to any one of 450, 460 or 470, based on whether a condition is met. For example, the central controller can determine whether the APU is in the APU ON state and the prime mover is in the prime mover OFF state for a period of time greater than a predetermined time. If the period of time is less than or equal to the predetermined time, the central controller can set the users' performance to a coaching status. Then the method 400 proceeds to 450. If the period of time is greater than the predetermined time, the central controller can set the users' performance to an incentive status. Then the method 400 proceeds to 460. If a user (for example, fleet manager) chooses to adjust user's (for example, a driver's) performance parameters via the user interface (such as the user interface 270 shown in FIG. 2), then the method proceeds to 470.

At 450 and 460, the system can provide a feedback to the user, for example, via a user interface. At 450, the system can, for example, through a mobile app, coach the driver by, for example, providing the driver hints or trainings to help the driver learn when to use APU and/or how to best control the power/energy usage. At 460, the system can, for example, through a mobile app, reward the driver by, for example, providing free shower(s) at the truck stop, free meals, or other incentive based programs. In some embodiments, the user's performance data from 425 can help to incentivize the driver to use the APU as much as possible. For example, the driver can be incentivized to cook in the vehicle by using vehicle accessories (such as microwave, coffee maker, etc.) powered by the APU. The driver can be incentivized to use the APU while the vehicle is parked at, for example, a parking lot. When the vehicle is parked, the prime mover speed (revolution per minute, RPM) can be zero. In some embodiments, the driver can be incentivized to not run the APU over the weekends. In some embodiments, the driver can be incentivized to conserve the power/energy usage.

In some embodiments, the system can include an alternator. The APU can be a diesel APU. With the diesel APU, the driver can be incentivized to run the diesel APU whenever the driver needs it. It will be appreciated that although the system can adjust the usage of the diesel APU to conserve fuel, the usage of the diesel APU takes little fuel. In some embodiments, the prime mover can be an electric engine. The APU can be an electric APU. With the electric APU, the system has a finite amount of battery power. The driver can be incentivized to conserve the battery power to make sure the battery power lasts for a primary purpose such as air conditioning. At 470, the system can adjust the reward parameters, for example, via a user interface. The reward parameters are parameters used to determine the user's performance, for example, the amount of incentives, the length of the predetermined time (regarding the overlap between the APU ON state and the prime mover OFF state), etc. In some embodiments, the system can decide to adjust user's performance parameters based on a user's performance information or a group of users' performance information. For example, based on a user's past performance and experience, the system can decide to increase or decrease the amount of incentives. Another example, based on a group of users' average performance, the system can decide to increase or decrease the length of the predetermined time (regarding the overlap between the APU ON state and the prime mover OFF state). Then the method 400 proceeds back to 425.

Back to 425, the central controller can determine a user's performance based on the APU usage status. In some embodiments, the external device can be a use activity monitor, for example, a bio-monitor in the cab of the vehicle. The users' performance can be an APU usage rate associated with a first timeline, the external device data can be the user's activity (for example, sleeping or moving) associated with a second timeline. The users' performance can be how much energy (or battery) would be needed (or saved) for an HVAC system (such as the secondary HVAC system 110 shown in FIG. 1) to adjust the temperature to a level that reflects the activity level of the driver. In such embodiments, the method 400 proceeds to 430.

At 430, the APU controller can adjust APU usage parameters. In some embodiments, the APU usage parameters can include the temperature that the system can set via, for example, the secondary HVAC system. In some embodiments, the system can provide a better place (for example, a suitable temperature, a suitable sleep condition) for the driver to get rest, and can monitor the drivers' response to the temperature. For example, when the driver is active (monitored by, for example, the bio-monitor) in the cab of the vehicle, the system can set the temperature at one level based on the activity of the driver. When the driver is at sleep, the system can control (for example, adjust down) the temperature depending on the activity level of the driver) to conserve the battery, or based on how much energy/battery the system have and a relationship between the ambient temperature and the activity level of the driver. Then the method 400 proceeds to 440. At 440, the APU is operated under the adjusted APU usage parameters.

FIG. 5 illustrates a list of external devices in a system for collecting, combining, analyzing, and providing feedback on APU data and external data, according to some embodiments.

In some embodiments, the external devices 510 (such as the external devices 250 shown in FIG. 2) include a prime mover 520 of the vehicle.

In some embodiments, the external devices 510 include a smart inverter 530. In some embodiments, devices/accessories in the vehicle powered by household voltage (for example, 110-120 volts) need a smart inverter 530. The smart inverter 530 can take direct circuit (DC) battery and turn the DC power into household voltage/current (i.e., alternate circuit (AC) power) to run devices (accessories) such as coffeemaker, TV, video game system, computers, etc. In some embodiments, the smart inverter 530 can be an inverter with wireless access such as, for example, a Bluetooth communication link, a ZigBee communication link, etc. An external controller (such as the external controller 240 shown in FIG. 2) can link to the smart inverter 530. In some embodiments, with a diesel APU, the diesel APU can charge the vehicle battery and the vehicle battery can provide power to the smart inverter 530.

In some embodiments, with an electric APU, the electric APU has its own internal battery and can use the vehicle battery as well. The system can use power from the vehicle battery to extend the run time of the electric APU. In such embodiments, if the driver is overusing the power off the vehicle battery by using devices (accessories), the system may not have enough power to run the HVAC unit when the driver is requesting air conditioning.

In some embodiments, when the external controller connects/links to the smart inverter 530, the smart inverter 530 can provide information on how the driver is using the smart inverter 530, and/or how much power the driver is consuming from the vehicle battery separated from the electric APU. If the driver is pulling excess energy of the vehicle battery running the smart inverter 530, for example, by using devices (i.e., accessories such as play station, big screen TV, microwave, etc.), the central controller can combine such power usage with the electric APU data (for example, the state of the charge of the electric APU) from the electric APU controller. If the driver needs an extended cooling (or heating) period, the driver can be incentivized not to run all the sources/devices/accessories and not to burn the vehicle battery down too quick because the electric APU will need those vehicle battery power to give an extended period, for example, a full 10 hours' of cooling (or heating).

In some embodiments, the central controller can check the electric APU charge state (whether the internal battery of the electric APU is fully charged and how much power/energy the electric APU has), when a smart inverter power consumption rate (the rate at which the devices or the accessories consume the vehicle battery power via a smart inverter) exceeds a predetermined rate, the central controller can set the user performance to a warning status. When the smart inverter power consumption rate is less than or equal to the predetermined rate, the central controller can set the user performance to a normal status. Referring back to FIG. 4, when the user performance is in a warning status, the method 400 can proceed to 430 (to adjust the electric APU usage or to adjust the devices/accessories usage) or 450. At 450, the user can enter a reason for the warning, via the user interface. When the user performance is in a normal state, the method 400 can proceed to 460.

In some embodiments, the external devices 510 include a battery 540 (e.g., a vehicle battery, an APU internal battery, etc.). In some embodiments, the external controller (or a battery health monitor) can link to the battery 540 and get the battery data. The system can combine the battery data (for example, the battery state of charge) from the external controller with how much load the driver is using on the smart inverter 530. In some embodiments, the combined data can provide information to predict the APU run time. In some embodiments, the combined data can help users understand their battery/power/energy usage profile, where the energy is used, and/or how much power the users have to put back into the system for a specific task (for example, providing cooling/heating for a period of time), etc.

In some embodiments, the central controller can check the battery state of charge (whether the battery 540 is fully charged and how much power/energy the battery 540 has), when a smart inverter power consumption rate (the rate at which the devices or the accessories consume the vehicle battery power via a smart inverter) exceeds a predetermined rate, the central controller can set the user performance to a warning status. The warning status can indicate that either the APU (or external device) usage parameters need to be adjusted, or the user needs to be coached. When the smart inverter power consumption rate is less than or equal to the predetermined rate, the central controller can set the user performance to a normal status. The normal status can indicate that the APU (or external device) usage parameters adjustment is not needed and coaching user is not needed.

Referring back to FIG. 4, when the user performance is in a warning status, the method 400 can proceed to 430 (to adjust the electric APU usage or to adjust the devices/accessories usage) or 450. At 430 or 450, the user interface can send warning to the user (for example, the driver or the fleet manager). The warning message can indicate that if the driver continues at this rate (i.e., the smart inverter power consumption rate) of energy consumption, he/she will limit the ability for the APU to provide him/her cooling or heating through the night or the day. The warning message can also indicate that the driver is consistently running the battery down and can raise an alert. The warning message can also indicate that because of the battery usage profile (for example, how much energy the driver is consuming), an extra energy source (for example, a 300 watts solar, or a big truck alternator) might be needed to help battery health. The user can act (for example, proscribe energy conservation methods, add solar or alternator, etc.) accordingly based on the warning messages via, for example, the user interface. When the user performance is in a normal state, the method 400 can proceed to 460 or 470.

In some embodiments, the external devices 510 include one or more sensors 550. In some embodiments, the one or more sensors 550 can include a temperature sensor. In some embodiments, the temperature sensor can be in a mobile device (for example, a mobile phone) or in the vehicle. Temperature data monitored by the temperature sensor can be sent to the external controller and can be combined with the APU data by the central controller. The combined data can help to regulate the APU setpoint (for example, at 430 in FIG. 4) according to driver comfort (based on the driver's body temperature or temperature in the cabin) and/or how much battery/power/energy the system has.

In some embodiments, the external devices 510 include a positioning device 560. In some embodiments, the positioning device 560 can be a Global Positioning System (GPS). In some embodiments, the positioning device 560 can be a WiFi based locator. In some embodiments, the positioning device 560 can be in a mobile device (for example, a mobile phone) or in the vehicle. Position/location data monitored by the positioning device 560 can be sent to the external controller and can be combined with the APU data by the central controller. The combined data can help to determine (for example, at 410 in FIG. 4) how the APU is used in a particular region.

In some embodiments, the external devices 510 include an electronic onboard recording device 570. In some embodiments, the electronic onboard recording device 570 can be an electronic logging device (ELD). In some embodiments, ELD data monitored by the ELD can include a vehicle speed, a prime mover speed, a prime mover status (e.g., idle, running, off, etc.), vehicle operational state, brake status, prime mover run hours, fault codes, ambient temperature, windshield wiper status, and/or any data that can be shown on the vehicle dashboard. Vehicle operational state can include vehicle states and condition such as prime mover idling, prime mover running above idle speed, etc.

The ELD data can be sent to the external controller and can be combined with the APU data by the central controller. The ELD data can help to determine (for example, at 410 or 425 in FIG. 4) the APU usage (for example, how long the truck/prime mover is idling and APU is ON at the same time). In some embodiments, when prime mover is idling and the ELD shows that the driver is on-duty, the central controller can determine that no coaching is needed. When prime mover is idling and the ELD shows that the driver is off-duty, after a predetermined period of time, the central controller can send coaching message to the driver. If the coaching event re-occurs for a predetermined times, the central controller can send a message to the fleet manager. In some embodiments, when prime mover is idling, the ELD shows that the driver is off-duty but the power take off status is active (i.e., authorized) and the APU is ON, the central controller can determine that no coaching is needed. When prime mover is running above idle speed and/or vehicle is in motion (via ELD/GPS), and the APU is running, the central controller can turn off the APU or change the state of APU/bunk climate control.

In some embodiments, the external devices 510 include one or more other devices 580. In some embodiments, the one or more other devices 580 can include a device that provides time zone information. The time zone information can be sent to the external controller and can be combined with the APU data by the central controller. The time zone information can help to determine (for example, at 410 in FIG. 4) the APU usage (for example, where the APU is used). In some embodiments, other devices 580 can include a WiFi connection point. The WiFi connection point can help the central controller to communicate the APU data to a remote device (for example, a remote server, a database, a cloud storage, etc.).

In some embodiments, the one or more other devices 580 can include a vehicle ignition status detector and/or a vehicle/prime mover speed detector. Ignition status and/or speed data monitored by the vehicle ignition status detector and/or vehicle/prime mover speed detector can be sent to the external controller and can be combined with the APU data by the central controller. The ignition status, location, and/or speed data can help to determine (for example, at 425 in FIG. 4) the driver's performance (for example, based on the overlap between the APU run time data and the vehicle key-off or prime mover RPM=0; reward a driver for hours not idling when parked, or for APU run hours, or for in compliance with company policy using a configurable reward system) or APU performance (for example, whether APU is under an appropriate run condition).

In some embodiments, the one or more other devices 580 can include a personal fitness device. The data (for example, body temperature and/or heart-rate) from the personal fitness device can be sent to the external controller and can be combined with the APU data by the central controller. The fitness data can help to determine (for example, at 430 in FIG. 4) the driver's comfortable level (for example, how much sleep the driver gets, the suitable temperature setting/adjustments corresponding to the driver's activities/physical status, etc.).

FIG. 6 illustrates a schematic view of a user interface 600 for collecting, combining, analyzing, and providing feedback on APU data and external data, according to some embodiments. In some embodiments, the user interface 600 can be a mobile app, a webpage, a website, or a computer application. The user interface 600 includes a font end 610 and can optionally include a backend 690. In some embodiments, the front end 610 can be a mobile HMI. In some embodiments, the front end 610 can be a webpage. In some embodiments, the front end 610 can be a computer application interface.

The front end 610 includes a display module 615, a control module 620, an interaction module 625 and one or more other modules 630. The display module 615 can display, for example, APU status (for example, from 315 in FIG. 3), external status (for example, from 330 in FIG. 3), APU usage status (for example, from 370 in FIG. 3 or 410 in FIG. 4), APU performance (for example, from 415 in FIG. 4), user's performance (for example, from 425 in FIG. 4), warnings or alarms (for example, from 430 or 450 in FIG. 4), etc. The APU status (for example, from 315 in FIG. 3) can include APU operational mode, etc. The external status (for example, from 330 in FIG. 3) can include, for example, fan speed, temperature, wall-thermostat, timers, etc.

The control module 620 can provide user controls, for example, to adjust reward parameters (for example, at 470 in FIG. 4), to adjust APU work/operational parameters (for example, at 420 in FIG. 4), to adjust APU usage parameters (for example, at 430 in FIG. 4), etc. Adjusting APU usage parameters (for example, at 430 in FIG. 4) can include adjusting temperature settings that the secondary HVAC system can provide.

The interaction module 625 can help user to interact with the user interface 600. For example, the interaction module 625 can provide interactive hints or coaching or trainings (for example, at 450 in FIG. 4) to the user, the interaction module 625 can provide interactive reward (for example, at 460 in FIG. 4) to the user, the interaction module 625 can provide interactive schedules to the user, the interaction module 625 can provide interactive incentives (for example, at 305 in FIG. 3) to incentivize the user to link the APU controller to the APU and/or to maintain the linkage (or connectivity or data channel) between the APU controller and the APU, the interaction module 625 can provide interactive incentives (for example, at 320 in FIG. 3) to incentivize the user to link the external controller to the external device(s) or to maintain the linkage (or connectivity or data channel) between the external controller and the external device(s), etc.

It will be appreciated that the modules 615, 620, 625, and 630 (for example, the incentive interface/module described at 320 or 460) can be in a customized dash board (for example, colors, sounds, icons and control algorithms can be customized by the user) and the functionalities performed by the modules can be exchangeable.

In some embodiments, the font end 610 can communicate with the backend 690 in a background thread. The backend 690 can perform actions such as linking (for example, at 340 in FIG. 3) the central controller to the APU controller and/or the external controller, combining (for example, at 350 in FIG. 3) the APU data and the external data, analyzing (for example, at 360 in FIG. 3) the combined data, storing the collected data, etc. In some embodiments, the actions can be performed by the central controller.

Aspects:

It is to be appreciated that any of aspects 1-14 can be combined with any of aspects 15-19, and that any of aspects 15-19 can be combined with aspect 20.

Aspect 1. A method for collecting, combining, analyzing, and providing feedback on auxiliary power unit (APU) data and external data, the method comprising:
  an APU controller linking to an APU of a vehicle;
  the APU controller collecting APU data from the APU, the APU data indicating an operational state of the APU;
  an external controller linking to at least one device that is external to the APU;
  the external controller collecting external data from the device, the external data indicating an operational state of the device;
  a central controller linking to the APU controller and the external controller; and
  the central controller determining an APU usage status based on the APU data and the external data, the APU usage status indicating an APU usage information under the operational state of the device.

Aspect 2. The method of aspect 1, wherein the external controller linking to the device includes a vehicle controller linking to a plurality of components of the vehicle;
  the operational state of the device includes a vehicle operational state.

Aspect 3. The method of any of aspects 1-2, wherein the APU controller, the external controller, and the central controller are located within a mobile device and communicate with an APU mobile human machine interface (HMI).

Aspect 4. The method of any of aspects 1-3 further comprising:
  a user interface linking to the central controller; and
  the user interface providing a feedback to users based on the APU usage status.

Aspect 5. The method of aspect 4, wherein the user interface is an APU mobile human machine interface (HMI).

Aspect 6. The method of aspect 4, wherein the feedback includes APU performance data.

Aspect 7. The method of aspect 6, further comprising:
  adjusting operational parameters of the APU based on the APU performance data, and
  operating the APU based on the adjusted operation parameters.

Aspect 8. The method of any of aspects 1-7, further comprising:
  the APU controller linking to a data store;
  the data store storing the APU data from the APU controller;
  the external controller linking to the data store;
  the data store storing the external data from the external controller; and Aspect 9. The method of aspect 8, wherein the central controller is located in a server.

Aspect 10. The method of any of aspects 1-9, wherein the device includes an engine, the device operational state includes an engine OFF state, and the APU operational state includes an APU ON state,
  the method further comprising:
  the central controller determining whether the APU is in the APU ON state and the engine is in the engine OFF state for a period of time greater than a predetermined time,
  when the period of time is greater than the predetermined time, the central controller setting a user performance to an incentive status, and
  when the period of time is less than or equal to the predetermined time, the central controller setting the user performance to a coaching status.

Aspect 11. The method of any of aspects 1-10, wherein the device includes a smart inverter, the device operational state includes a smart inverter power consumption rate, and the APU operational state includes an APU charge state,
  the method further comprising:
  the central controller determining whether the smart inverter power consumption rate exceeds a predetermined rate,
  when the smart inverter power consumption rate exceeds the predetermined rate, the central controller setting a user performance to a warning status based on the APU charge state, and
  when the smart inverter power consumption rate is less than or equal to the predetermined rate, the central controller setting the user performance to a normal status based on the APU charge state.

Aspect 12. The method of aspect 11, wherein the device includes a battery of a vehicle,
  the device operational state further includes a battery charging status,
  the central controller is configured to further base on the battery charging status when setting the APU usage status to the warning status or to the normal status.

Aspect 13. The method of any of aspects 1-12, further comprising:
  adjusting operational parameters of the APU based on the APU usage status, and
  operating the APU based on the adjusted operation parameters.

Aspect 14. The method of any of aspects 1-13, further comprising:
  setting predetermined reward parameters, and
  the central controller is configured to further base on the predetermined reward parameters when determining the APU usage status.

Aspect 15. A system for collecting, combining, analyzing, providing feedback on auxiliary power unit (APU) data and external data, the system comprising:
  an APU controller configured to:
  link to an APU of a vehicle, and
  collect APU data from the APU, the APU data indicating an operational state of
  the APU;
  an external controller configured to:
  link to at least one device that is external to the APU, and
  collect external data from the device, the external data indicating an operational state of the device; and
  a central controller configured to:
  link to the APU controller and the external controller, and
  determine an APU usage status based on the APU data and the external data, the APU usage status indicating an APU usage information under the operational state of the device.

Aspect 16. The system of aspect 15, wherein the external controller includes a vehicle controller, the vehicle controller is configured to link to a plurality of components of the vehicle, and the vehicle controller is configured to determine a vehicle operational state.

Aspect 17. The system of any of aspects 15-16, further comprising a mobile device,
  wherein the APU controller, the external controller, and the central controller are located within the mobile device.

Aspect 18. The system of any of aspects 15-17, further comprising a user interface, the user interface is configured to link to the central controller, and the user interface is configured to provide a feedback to users based on the APU usage status.

Aspect 19. The system of any of aspects 15-18, further comprising a data store, wherein the APU controller is configured to link to the data store;

the data store is configured to store the APU data from the APU controller;

the external controller is configured to link to the data store; and the data store is configured to store the external data from the external controller.

Aspect 20. A user interface for collecting, combining, analyzing, and providing feedback on auxiliary power unit (APU) data and external data, the user interface comprising:

a control module configured to provide incentives for users to link an APU controller to an APU of a vehicle, the control module being configured to link an external controller to a plurality of devices that are external to the APU; and a display module configured to display an APU usage status based on combined APU data and external data.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for collecting, combining, analyzing, and providing feedback on auxiliary power unit (APU) data and external data, the method comprising:

an APU controller linking to an APU of a vehicle, the vehicle having a primary power source configured to power the vehicle to operate including powering a primary heating, ventilation, and air conditioning (HVAC) system; and the APU being configured to power a secondary HVAC system when the primary power source is unavailable;

the APU controller collecting APU data from the APU, the APU data indicating an operational state of the APU;

an external controller linking to at least one device that is external to the APU;

the external controller collecting external data from the device, the external data indicating an operational state of the device;

a central controller linking to the APU controller and the external controller;

the central controller determining an APU usage status based on the APU data and the external data, the APU usage status indicating an APU usage information under the operational state of the device;

when the APU is in an APU ON state and the device is in a device OFF state for a period of time greater than a predetermined time, the central controller setting a user performance to an incentive status;

when the period of time is less than or equal to the predetermined time, the central controller setting the user performance to a coaching status.

2. The method of aspect 1, wherein the external controller linking to the device includes a vehicle controller linking to a plurality of components of the vehicle;

the operational state of the device includes a vehicle operational state.

3. The method of claim 1, wherein the APU controller, the external controller, and the central controller are located within a mobile device and communicate with an APU mobile human machine interface (HMI).

4. The method of claim 1, further comprising:

a user interface linking to the central controller; and the user interface providing a feedback to users based on the APU usage status.

5. The method of claim 4, wherein the user interface is an APU mobile human machine interface (HMI).

6. The method of claim 4, wherein the feedback includes APU performance data.

7. The method of claim 6, further comprising:

adjusting operational parameters of the APU based on the APU performance data, and operating the APU based on the adjusted operation parameters.

8. The method of claim 1, further comprising:

the APU controller linking to a data store;

the data store storing the APU data from the APU controller;

the external controller linking to the data store;

the data store storing the external data from the external controller.

9. The method of claim 8, wherein the central controller is located in a server.

10. The method of claim 1, wherein the device includes a smart inverter, the device operational state includes a smart inverter power consumption rate, and the APU operational state includes an APU charge state, the method further comprising:

the central controller determining whether the smart inverter power consumption rate exceeds a predetermined rate, when the smart inverter power consumption rate exceeds the predetermined rate, the central controller setting a user performance to a warning status based on the APU charge state, and when the smart inverter power consumption rate is less than or equal to the predetermined rate, the central controller setting the user performance to a normal status based on the APU charge state.

11. The method of claim 10, wherein the device includes a battery of a vehicle, the device operational state further includes a battery charging status, the central controller is configured to further base on the battery charging status when setting the APU usage status to the warning status or to the normal status.

12. The method of claim 1, further comprising:

adjusting operational parameters of the APU based on the APU usage status, and operating the APU based on the adjusted operation parameters.

13. The method of claim 1, further comprising:

setting predetermined reward parameters, and the central controller is configured to further base on the predetermined reward parameters when determining the APU usage status.

14. A system for collecting, combining, analyzing, providing feedback on auxiliary power unit (APU) data and external data, the system comprising:
an APU controller configured to:
link to an APU of a vehicle, the vehicle having a primary power source configured to power the vehicle to operate including powering a primary heating, ventilation, and air conditioning (HVAC) system; and the APU being configured to power a secondary HVAC system when the primary power source is unavailable; and
collect APU data from the APU, the APU data indicating an operational state of the APU;
an external controller configured to:
link to at least one device that is external to the APU, and
collect external data from the device, the external data indicating an operational state of the device; and
a central controller configured to:
link to the APU controller and the external controller,
determine an APU usage status based on the APU data and the external data, the APU usage status indicating an APU usage information under the operational state of the device,
when the APU is in an APU ON state and the device is in a device OFF state for a period of time greater than a predetermined time, set a user performance to an incentive status,
when the period of time is less than or equal to the predetermined time, set the user performance to a coaching status.

15. The system of claim 14, wherein the external controller includes a vehicle controller, the vehicle controller is configured to link to a plurality of components of the vehicle, and the vehicle controller is configured to determine a vehicle operational state.

16. The system of claim 14, further comprising a mobile device,
wherein the APU controller, the external controller, and the central controller are located within the mobile device.

17. The system of claim 14, further comprising a user interface, the user interface is configured to link to the central controller, and the user interface is configured to provide a feedback to users based on the APU usage status.

18. The system of claim 14, further comprising a data store,
wherein the APU controller is configured to link to the data store;
the data store is configured to store the APU data from the APU controller;
the external controller is configured to link to the data store; and
the data store is configured to store the external data from the external controller.

19. A system for collecting, combining, analyzing, providing feedback on auxiliary power unit (APU) data and external data, the system comprising:
an APU controller configured to:
link to an APU of a vehicle, and
collect APU data from the APU, the APU data indicating an operational state of the APU;
an external controller configured to:
link to at least one device that is external to the APU, and
collect external data from the device, the external data indicating an operational state of the device; and
a central controller configured to:
link to the APU controller and the external controller, and
determine an APU usage status based on the APU data and the external data, the APU usage status indicating an APU usage information under the operational state of the device,
wherein the device operational state includes a device OFF state, and the APU operational state includes an APU ON state,
the central controller is further configured to:
determine whether the APU is in the APU ON state and the device is in the device OFF state for a period of time greater than a predetermined time,
set a user performance to an incentive status when the period of time is greater than the predetermined time, and
set the user performance to a coaching status when the period of time is less than or equal to the predetermined time.

* * * * *